United States Patent [19]

Frost

[11] 3,941,749

[45] Mar. 2, 1976

[54] LINEAR OXADIAZOLE-IMIDE COPOLYMERS

[75] Inventor: Lawrence W. Frost, Murrysville, Pa.

[73] Assignee: Westinghouse Electric Corporation, Pittsburgh, Pa.

[22] Filed: Oct. 23, 1973

[21] Appl. No.: 408,891

Related U.S. Application Data

[63] Continuation of Ser. No. 405,573, Oct. 21, 1964, abandoned.

[52] U.S. Cl. ........ 260/65; 260/32.6 NA; 260/47 CP; 260/78 A; 260/78 TF; 428/474
[51] Int. Cl.² ................... C08G 73/10; C08G 73/14
[58] Field of Search ............... 260/78 TF, 65, 47 CP

[56] References Cited
UNITED STATES PATENTS

| | | | |
|---|---|---|---|
| 3,179,630 | 4/1965 | Endrey | 260/78 TF |
| 3,179,632 | 4/1965 | Hendrix | 260/78 TF |
| 3,179,634 | 4/1965 | Edwards | 260/78 TF |
| 3,238,183 | 3/1966 | Frazer | 260/78 TF |

*Primary Examiner*—Harold D. Anderson
*Attorney, Agent, or Firm*—A. Mich, Jr.

[57] ABSTRACT

Polymers containing both oxadiazole and imide recurring units are made from soluble polymeric precursors that contain hydrazide and/or amic acid recurring units. Dehydration of the hydrazide produces the oxadiazole unit and dehydration of the amic acid produces the imide unit. The oxadiazole unit may also be advantageously formed in various monomeric hydrazine compounds. The monomeric hydrazine compounds are made reactive by converting the dinitroso form of the compound into a reactive diamino form. The polymers may be used as molding and laminating resins, wire coatings, films, filaments and adhesives.

6 Claims, No Drawings

LINEAR OXADIAZOLE-IMIDE COPOLYMERS

This is a continuation of application Ser. No. 405,573, filed Oct. 21, 1964, now abandoned.

The present invention relates to a class of novel linear oxadiazole-imide copolymers. More particularly, the oxadiazole-imide copolymers comprise substantially infusible and insoluble polymers in which aromatic groups are linked together in part by oxadiazole groups and in part by cyclic imide groups. The invention relates to the novel oxadiazole-imide copolymers, to the method of their preparation, and to their use.

The linear polymers of the invention are characterized by extraordinarily high thermal and oxidative stability, good film forming properties, toughness, and other physical properties which render them particularly suitable for use as molding and laminating resins, wire coatings, films for electrical insulating or mechanical use, filaments, adhesives, and the like.

It is a primary object of the invention to provide a class of novel resinous compositions comprising copolymers in which aromatic groups are linked together, in part by oxadiazole groups and in part by cyclic imide groups.

Another object of the invention resides in the provision of soluble polymeric precursors, or intermediates, from which the copolymers can be applied and converted to infusible and insoluble condition by heat.

A further object of the invention resides in the provision of a novel method for preparing the oxadiazoleimide copolymers.

Other objects will become apparent from the following detailed description of the invention.

Generically, the novel substantially infusible and insoluble resinous compositions of the invention have the following general formula:

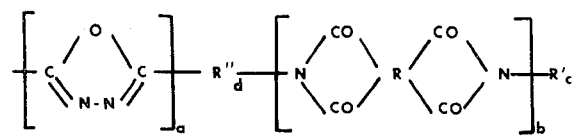

wherein R is a tetravalent organic radical, R' and R'' are divalent aromatic radicals, $a$, $b$, $c$, and $d$ are positive integers having values of from zero to about 100,000 so chosen that at least one oxadiazole and at least two imide groups are present in the molecule, $b$ is a positive integer having a value of from 1 to about 100,000 and the sum of $a$, $b$, $c$ and $d$ has a value of about 10 to about 400,000.

In the above structural formula R is a tetravalent organic radical derived from a tetracarboxylic dianhydride and in which the four bonds are so arranged that the imide rings may contain either five or six members. Typical organic radicals which may be present as R include the following:

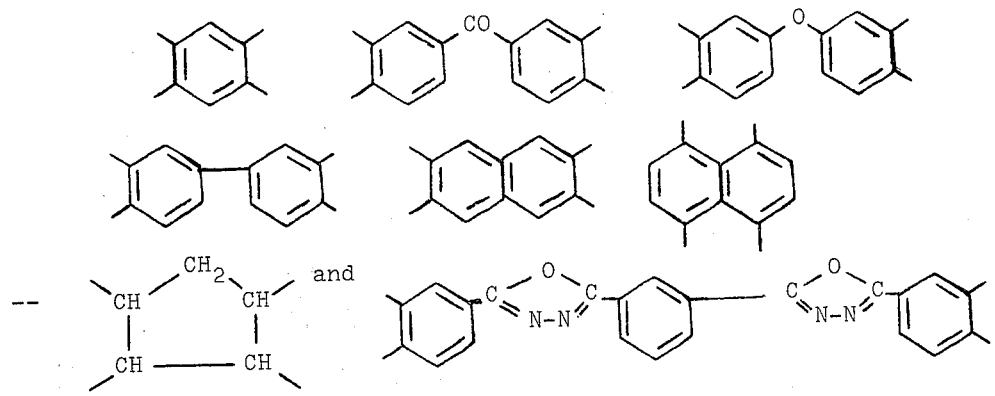

One or more of these radicals may be present in the polymer. Obviously, other similar tetravalent organic radicals may also be present in the polymer structure.

Typical divalent aromatic radicals (R' and R'') include the following:

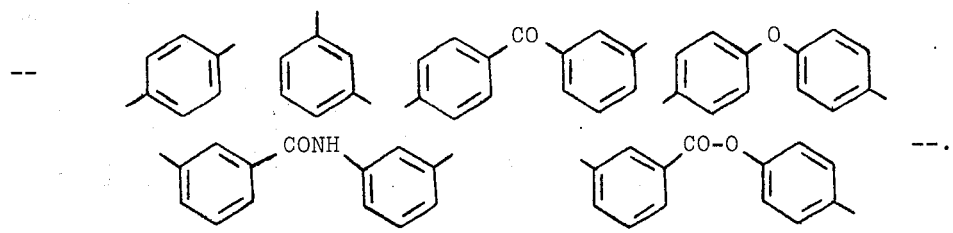

Other similar divalent aromatic radicals may be included in the polymer structure. One or more types of divalent aromatic radicals may be included in the polymer structure.

The cured polymers are essentially infusible and insoluble. It has been found, however, that soluble polymeric precursors, or intermediates, are easily produced from which the final polymers are obtained by heating or by a chemical curing process. Solutions of the intermediates provide a convenient means of applying the polymers to a substrate or of casting films, drawing fibers, or otherwise fabricating them. Both the imide and the oxadiazole groups are generated by dehydration reactions. The former is derived from an amic acid group, and the latter from a hydrazide group. The reactions involved are illustrated by the following equations:

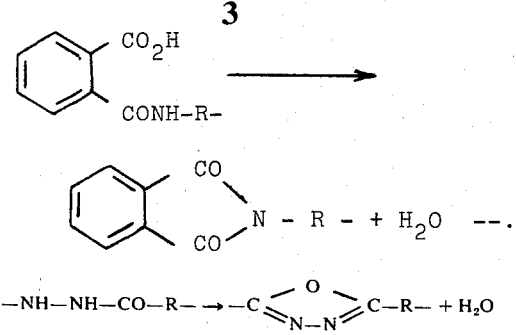

2. —CO—NH—NH—CO—R— → —C$\underset{N-N}{\overset{O}{\diagup\diagdown}}$C—R— + H₂O  —.

From these typical reactions it will be appreciated that the polymer precursors, or intermediates, may have one or more of the following structures:

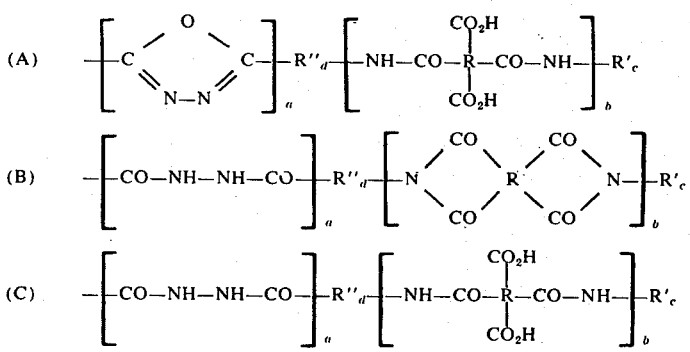

wherein R, R', R'', a, b, c, and d have the same values as given above.

In these intermediates both the amic acid and the hydrazide groups exert a solubilizing effect on the polymer and, therefore, all three types are of value. It has been established, however, that the amic acid linkage is more effective than the hydrazide linkage in contributing to the solubility of the polymer.

Another difference between the precursor groups resides in their relative rates of dehydration when heated. For example, the conversion of an amic acid to an imide group proceeds more rapidly or under milder conditions than the conversion of a hydrazide to an oxadiazole group. If both groups are present, the amic acid is converted almost completely to imide before appreciable conversion of the hydrazide to oxadiazole occurs. A stepwise cure of this type is of value in some applications. For example, in laminating or adhesive bonding, it is desirable that a relatively stable, partially cured resin be formed as a coating on the substrate. During the subsequent bonding operation, additional heat and pressure are applied, and the resin must flow sufficiently to bond together, or to fill the interstices of the substrate before it cures to an infusible condition.

For maximum thermal stability of the final polymer it is desirable that conversion to both imide and oxadiazole groups be complete. This objective is best attained by forming the oxadiazole linkage by chemical or thermal dehydration of the monomer, which can then be purified conveniently before polymerization. This procedure gives rise to the amic acid-oxadiazole intermediate which can be cured either by heat or by a chemical dehydration. Since the conversion to imide proceeds easily and quantitatively, purification is not necessary at this stage.

The polymerization procedure is carried out by dissolving the selected intermediates in a suitable solvent, for example, dimethylacetamide, and stirring the mixture at relatively low temperatures, e.g., room temperature down to about 2°–10°C. until the desired viscosity has been reached. The preparation of the monomers, their reduction to amino compounds, and the preparation of the copolymer intermediates will become apparent from the specific examples.

The invention will be more particularly described by the following specific examples. It is to be understood that the examples are given for the purpose of illustration only. In the examples, the following symbols are used to represent both the monomeric compound itself and the portion of the compound incorporated into a monomer or polymer, after reaction of one or more functional groups:

| | |
|---|---|
| BTDA | 3,3',4,4'-benzophenonetetracarboxylic dianhydride |
| CPDA | 1,2,3,4-cyclopentanetetracarboxylic dianhydride |
| DAPE | 4,4'-diaminodiphenyl ether |
| H | hydrazine, monosubstituted on one or both nitrogen atoms |
| IP | isophthaloyl |
| MAB | m-aminobenzoyl |
| MAP | m-aminophenyl |
| MNB | m-nitrobenzoyl |
| MNP | m-nitrophenyl |
| MP | m-phenylene |
| NTDA | 1,4,5,8-naphthalenetetracarboxylic dianhydride |
| ODZ | 1,3,4-oxadiazole, substituted in the 2 and 5 positions |
| OX | oxalyl |
| PAB | p-aminobenzoyl |
| PAP | p-aminophenyl |
| PMDA | pyromellitic dianhydride |
| PNB | p-nitrobenzoyl |
| PNP | p-nitrophenyl |
| IMA | trimellitic anhydride |
| TMAC | trimellitic anhydride chloride |

A. PREPARATION OF MONOMERIC COMPONENTS

EXAMPLE I

Preparation of N, N' - bis (m-nitrobenzoyl) hydrazine, (MNB)₂H

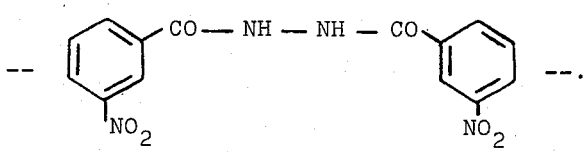

A mixture of 1500 ml of acetone, 212g (2 moles) of sodium carbonate, and 59g (1 mole) of 85% hydrazine hydrate was stirred rapidly while a solution of 371g (2 moles) of m-nitrobenzoyl chloride in 1000 ml of acetone was added in 2.5 hours. The mixture was stirred for 3 hours more and was then evaporated in a stream of nitrogen at room temperature to near dryness. The residue was mixed with 1000 ml of 2.4 N HCl, and the resulting white solid was filtered off, washed with water, and recrystallized from about 5000 ml of glacial acetic acid. The fine white needles were washed with acetic acid, followed by methanol, and dried at 135°C. to give 153g (46% yield) of N,N'-bis (m-nitrobenzoyl) hydrazine, m.p. 245°C.

oyl chloride in xylene was added slowly. An ice bath was used to keep the mixture below 100°C. Stirring was continued for 30 minutes, at which time the product was almost completely solid. After 2 hours, 1500 ml of water was added together with enough HCl to make the mixture slightly acidic. The white solid that formed was filtered off, washed with water, and recrystallized from glacial acetic acid to give 144g (87% yield) of pale yellow needles, m.p. 250°–251°C.

EXAMPLE IV

Preparation of Isophthalbis [N' - (p-nitrobenzoyl) hydrazide], (PNB-H$_2$)IP

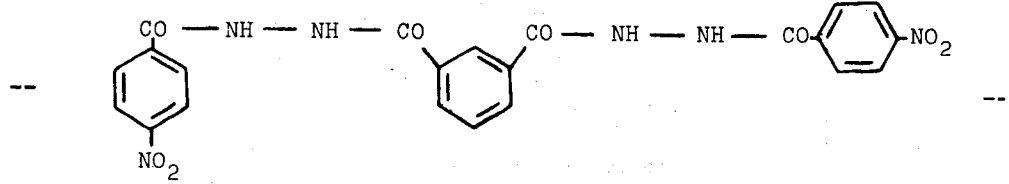

EXAMPLE II

Preparation of m-Nitrobenzhydrazide, MNB-H

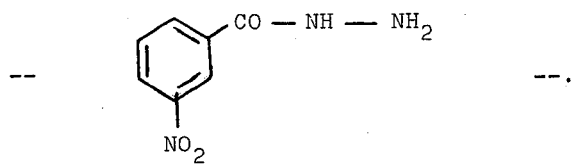

A mixture of 167g (1 mole) of m-nitrobenzoic acid and 160g (5 moles) of methanol was refluxed with stirring for 3 hours while a stream of dry HCl was bubbled in. A precipitate which formed on cooling to room temperature was filtered off, and dissolved in hot methanol. The solution was boiled for 10 minutes with a mixture of sodium carbonate and anhydrous calcium sulfate and was then filtered. The filtrate was stirred and refluxed while 118g (2 moles) of 85% hydrazine hydrate was added. The mixture was refluxed for 90 minutes and allowed to cool. The solid product was filtered off and recrystallized from water to give 258 g of m-nitrobenzhydrazide, m.p. 155°–155.5°C.

EXAMPLE III

Preparation of N-(m-nitrobenzoyl)-N'-(p-nitrobenzoyl) hydrazine MNB-H-PNB

A mixture of 91.5 g (0.5 mole) of m-nitrobenzhydrazide from Example II, 53g (0.5 mole) of sodium carbonate, and 200 ml of dimethylacetamide was stirred while a warm solution of 93g (0.5 mole) of p-nitrobenz- A mixture of 48.5g (0.25 mole) of isophthaldihydrazide, 53g (0.5 mole) of sodium carbonate, and 200g of dimethylacetamide was stirred while a solution of 140g (0.75 mole) of p-nitrobenzoyl chloride in 100g of dimethylacetamide was added slowly. An exothermic reaction occurred, with the formation of a transient dark red color. When most of the solution had been added, the reaction mixture solidified. After standing overnight the solid was broken up and mixed with 1000 ml of water and enough HCl to make the mixture slightly acid. A light yellow solid separated and was filtered off, recrystallized from dimethylacetamide and dried to give 88g (72% yield) of white granular product, m.p. 316°C.

EXAMPLE V

Preparation of N,N' - bis (p-nitrobenzoyl) hydrazine, (PNB)$_2$H

A solution of 250 ml water, 5.9g (0.1 mole) of 85% hydrazine hydrate, and 55g (0.4 mole) of sodium acetate trihydrate was stirred in a Waring blendor while a warm solution of 37g (0.2 mole) of p-nitrobenzoyl chloride in 250 ml of benzene was added rapidly. A heavy precipitate formed. An additional 50 ml of water was added, and stirring was continued for three minutes. The solid product was removed by filtration, washed with benzene and water, and dried at 100°C. under vacuum. A yellow powder was obtained weighing 30g (91% yield), m.p. 294°C. Recrystallization from a mixture of dimethylacetamide and water raised the m.p. to 296°–297°C.

EXAMPLE VI

Preparation of Oxalylbis [N' - (m-nitrobenzoyl) hydrazide], (MNB-H)₂

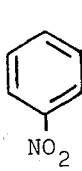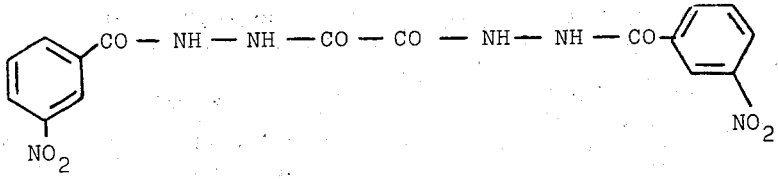

A mixture of 500 ml of water, 12g (0.1 mole) oxalyl dihydrazide, and 32g (0.3 mole) sodium carbonate was stirred in a Waring blendor while a solution of 38g (0.2 mole) of m-nitrobenzoyl chloride was added slowly. A very thick suspension formed, which was mixed with an additional 500 ml of water and stirred by hand for several minutes. The solid product was washed with dilute acetic acid, filtered, washed with water, recrystallized from a mixture of dimethylacetamide and water, and dried for 2 hours at 150°C. to give 36g (100% yield) of a white powder, m.p. about 326°C., with decomposition.

EXAMPLE VII

Preparation of Isophthalbis [N' - (m-nitrobenzoyl) hydrazide], (MNB-H)₂IP

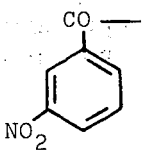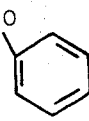

A mixture of 48.5g (0.25 mole) isophthaldihydrazide, 250g dimethylacetamide, and 58g (0.55 mole) sodium carbonate was stirred while a solution of 102g (0.55 mole) m-nitrobenzoyl chloride in 200 ml benzene was added slowly. Stirring was continued for 2 hours, and the mixture was poured into 2 l of water. It was made slightly acidic with HCl, and the solid product was filtered off, washed with water, recrystallized from a mixture of dimethylacetamide and water, and dried at 100°C. in vacuum. A white powder was obtained, weighing 99g (81% yield), m.p. 288°–290°C.

EXAMPLE VIII

Conversion of Hydrazides to Oxadiazoles

The general procedure used to convert substituted hydrazides to the corresponding oxadiazoles was to mix the hydrazide with ten times its weight of polyphosphoric acid (84.5% $P_2O_5$), heat the mixture slowly to 200°–220°C., with stirring, cool to about 120°C., and pour into water. The solid product obtained was filtered off and recrystallized from a suitable solvent, usually dimethylacetamide. Using this method, the following oxadiazoles were prepared:

| Code Name | Yield % | m.p., °C, | From Product of Example Number |
|---|---|---|---|
| (MNP)₂-ODZ | 74 | 233.5–234 | I |
| MNP-ODZ-PNP | 62 | 251.5–252 | III |
| (PNP)₂ODZ | 97 | 314.5–315 | V |
| (MNP-ODZ)₂ | 58 | 278–279 | VI |
| (MNP-ODZ)₂-MP | 80 | 328–331 | VII |

EXAMPLE IX

Hydrogenation of Nitro Compounds

Diamines were prepared by hydrogenation of the various dinitro compounds. In most cases a mixture of 20–30g of the dinitro compound, 200 ml of dimethylacetamide, and one gram of 5% palladium-on-carbon catalyst was hydrogenated in a shaker at 40–55 psi and 60°–80°C. until hydrogen was no longer absorbed. The resulting solution was filtered, and the filtrate was passed through a 1X20 cm column of 80–200 mesh absorption alumina. The resulting clear yellow solution was mixed with about an equal volume of water and allowed to crystallize. The solid product was filtered off and dried in a vacuum oven at 100°–125°C. The diamine obtained from (MNP-ODZ)₂ (Example VIII) turned out to be rather insoluble in dimethylacetamide. It was dissolved in hexamethylphosphoramide to give a suitable solution to put through the alumina column.

Diamines prepared as described are listed below:

| Diamine No. | Code Name | Yield % | m.p., °C. | From Product of Example Number |
|---|---|---|---|---|
| 1 | (MAB)₂-H | 90 | 261–261.5 | I |
| 2 | MAB-H-PAB | 94 | 219–220 | III |
| 3 | IP-(PAB-H)₂ | 95 | 305–306 | IV |
| 4 | (MAP)₂-ODZ | 86 | 250.5–251.5 | VIII (MNP)₂-ODZ |
| 5 | MAP-ODZ-PAP | 89 | 239–239.5 | VIII MNP-ODZ-PNP |
| 6 | (PAP)₂-ODZ | 68 | 262.5–263 | VIII (PNP)₂-ODZ |
| 7 | (MAP-ODZ)₂ | 59 | 347.5–348 | VIII (MNP-ODZ)₂ |
| 8 | (MAP-ODZ)₂-MP | 94 | 273–277 | VIII (MNP-ODZ)₂-MP |

EXAMPLE X

Preparation of Oxybis
[N-(4'-phenylene)-4-(chlorocarbonyl) phthalimide],
(TMAC)₂DAPE

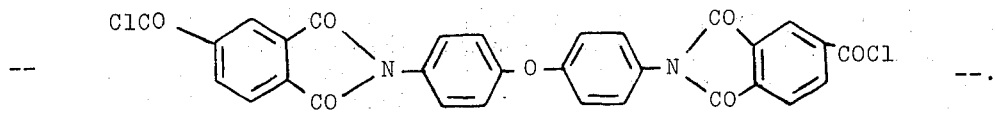

A solution of 50g (0.25 mole) of 4,4'-oxydianiline in 150g of dimethylacetamide was stirred while 96g (0.50 mole) of trimellitic anhydride was added slowly. The temperature was kept below 40°C. by cooling with water. An additional 50g of dimethylacetamide was added to reduce the viscosity, and the mixture was stirred for 26 hours. A clear solution was obtained, to which was added 56g (0.55 mole) of acetic anhydride, followed by 10g of pyridine. A precipitate formed over a period of several hours. The mixture was heated to 160°C. to coagulate the solid and complete the reaction. After cooling, the solid was filtered off. A small amount was obtained also by diluting the filtrate with water. The two crops of solid were combined and recrystallized from dimethylacetamide to give 102g (75% yield) of yellow-orange powder, (TMA)₂DAPE m.p. 384°–386°C.

A portion of this product (27.4g, 0.05 mole) was refluxed for 2 hours with 50g (0.42 mole) of thionyl chloride. A mixture of 5 ml of dimethylformamide and 25 ml of benzene was added, and refluxing continued for 3 more hours. The product was filtered off, washed with benzene, and dried for one hour at 150°C. to give 29g (99% yield) of the diacyl chloride, m.p. 242.5°–243.5°C.

B. PREPARATION AND CURE OF AN IMIDE-HYDRAZIDE POLYMER

EXAMPLE XI

Preparation of (DAPE-TMA₂) (IP-H₂) Polymer

A solution of 1.942g (0.01 mole) of isophthaldihydrazide in 50 ml of hexamethylphosphoramide was stirred at 0°–2°C. while 5.83g (0.01 mole) of the product of Example X was added. The solution was held at 2°–5°C. for 3 hours and was then stirred overnight while warming slowly to room temperature. A clear yellow, viscous solution was obtained, which was poured into rapidly stirred water. The precipitate obtained was washed three times with distilled water and twice with acetone, and was dried for 30 minutes at 150°C. to give a pale yellow powder weighing 6.64g (94% yield). A 10% solution of the polymer in dimethylacetamide was a clear yellow liquid when warm but formed a gel at room temperature. A 5% solution behaved similarly, but required about an hour at room temperature to become sufficiently gelled that it would not pour. Both gels became fluid upon stirring at room temperature. A film of the solution was baked for an hour at 150°C. and then for 2 hours at 300°C. to give an amber colored film, clear and flexible in very thin areas, but opaque and cracked in sections 1 mil in thickness. The film was insoluble in hot dimethylacetamide, but a similar film without the 300°C. bake was slowly soluble in warm dimethylacetamide.

C. PREPARATION AND CURE OF AMIC ACID - HYDRAZIDE POLYMERS

EXAMPLE XII

Reaction of Diamino Hydrazides with Dianhydrides

The diamino hydrazide compounds described in Example IX (monomers 1–3) were reacted with dianhydrides by the following general procedure. The diamine was dissolved in sufficient dimethylacetamide to give a 20–25% solution of polymer, and the solution was stirred at room temperature while solid dianhydride was added in portions. The viscosity was estimated periodically by measuring the time of flow of the solution from a glass tube dipping into the reaction mixture. When the viscosity reached a maximum, addition was stopped. The amount of anhydride required in each case was within 1% of that calculated. The product in all cases was a clear, yellow, viscous solution. A portion of it was diluted to 0.5% with dimethylacetamide for inherent viscosity determination, values of which were as follows:

| Polymer No. | Diamine, from Ex. IX | Anhydride* | Inh. Visc. at 25°C., deciliters/g. |
|---|---|---|---|
| OI-1 | 1. (MAB)₂-H | PMDA | 0.53 |
| OI-2 | 1. (MAB)₂-H | BTDA | 0.65 |
| OI-3 | 2. MAB-H-PAB | BTDA | 0.724 |
| OI-4 | 3. IP-(PAB-H)₂ | BTDA | 0.924 |

*PMDA, Pyromellitic dianhydride
BTDA 3.3',4.4'-Benzophenonetetracarboxylic dianhydride

EXAMPLE XIII

Cure of Amic Acid - Hydrazide Polymers

Films were cast by baking the solutions from Example XII on aluminum in air at 150°C. for 205 hours. Clear yellow, flexible films were obtained. The film from OI-2 was particularly tough. It could be stripped from the substrate and creased repeatedly without cracking. Films cast in this way are largely in the imide-hydrazide form. Conversion to the imide-oxadiazole requires additional heating. For example, a thin film of OI-1 polymer was baked for 5 hours at 150°C. and for 8 hours at 200°C. to complete the imidization reaction, and was then baked at 325°C. Weight loss data at 325°C. were as follows:

| Time, Hrs. | Wt. Loss at 325°C., % |
|---|---|
| 1 | 3.1 |
| 4 | 4.8 |
| 21 | 7.4 |
| 28 | 8.1 |
| 45 | 8.6 |
| 145 | 11.6 |
| 195 | 12.9 |
| 241 | 14.1 |
| 310 | 15.7 |

The rapid loss of weight up to about 25 hours is believed to be due to conversion of hydrazide to oxadiazole groups, with loss of water. Beyond that point the rate of loss is nearly constant at about 0.029%/hr. and probably represents slow degradation of the cured polymer.

Infrared absorption spectra of very thin films of OI-1 and OI-2 on salt plates were measured periodically as the samples were heated for 20 hrs. at 130°C. under vacuum, followed by 80 hrs. at 210°C. under vacuum, and then 48 hrs. at 325°C. in air. Imide formation (peaks at 5.65, 5.85, and 7.25$\mu$) was largely complete at the end of the 130°C. treatment. The oxadiazole peaks at 6.5 and 6.65$\mu$ began to appear during the 210°C. heating and reached maximum values in the first few hours at 325°C. Degradation of the polymer at 325°C. was accompanied by a slow weakening of all absorption bands.

D. PREPARATION AND CURE OF AMIC ACID - OXADIAZOLE POLYMERS

EXAMPLE XIV

Reaction of Diamino Oxadiazoles with BTDA

The procedure of Example XII was repeated, using the diamino oxadiazoles described in Example IX, with 3,3', 4,4'-benzophenonetetracarboxylic dianhydride, and sufficient dimethylacetamide to give 15% solutions. Inherent viscosities were determined on 0.5% solutions of these polymers at 25°C., with the following results:

| Polymer No. | Diamine, from Example IX | Inh. Visc. at 25°C., dl/g |
|---|---|---|
| OI-2A | 4. (MAP)$_2$-ODZ | 0.703 |
| OI-3A | 5. MAP-ODZ-PAP | 1.052 |
| OI-5A | 6. (PAP)$_2$-ODZ | 1.141 |
| OI-6A | 7. (MAP-ODZ)$_2$ | 0.306 |
| OI-7A | 8. (MAP-ODZ)$_2$-MP | 0.422 |

In addition, copolymers were prepared by a similar procedure, using the following combinations of ingredients:

| Diamine from Ex. IX, molar proportion | | Dianhydride, molar proportion |
|---|---|---|
| 0.5 (MAP)$_2$-ODZ + 0.5 (PAP)$_2$-ODZ | 1.0 | PMDA |
| 1.0 (MAP)$_2$-ODZ | 0.6 | BTDA + 0.4 PMDA |
| 1.0 MAP-ODZ-PAP | 0.9 | BTDA + 0.1 CPDA |
| 1.0 (MAP)$_2$-ODZ | 0.95 | BTDA + 0.05 NTDA |
| 0.5 (MAP)$_2$-ODZ + 0.5 (MAP-ODZ)$_2$-IP | 0.5 | PMDA + BTDA |

When more than one diamine was employed, the mixture of diamines was dissolved in DMAC before addition of the dianhydride. When more than one dianhydride was used, an intimate mixture of the solid dianhydrides was added to the diamine solution. In all cases, viscous solutions were obtained from which films could be cast by the procedure of EX. XV.

EXAMPLES XV

Cure of Amic Acid-Oxadiazole Polymers

Thin films were cast on aluminum from the various products of Example XIV by baking in air for one hour at each of the following successive temperatures: 50°–100°, 100°–150°, 200°, 250°, 300°C.; and ½ hr. at 325°C. The films were all clear amber throughout. At the end of the 150° bake all were flexible, but only OI-3A could be creased sharply without cracking. After the 325° bake, all five films could be creased repeatedly without cracking. They adhered very strongly to the aluminum and could not be peeled off. Films cast from mixtures of OI-2A and OI-5A, as well as mixtures of OI-2A, OI-6A, and OI-1 (Example XII) gave similar properties.

E. THERMAL STABILITY AND MECHANICAL PROPERTIES

EXAMPLE XVI

Weight Loss of Imide-Oxadiazole Films

Films about 0.001 inch thick of the products of Example XIV were cast on aluminum by the procedure of Example XV. They were aged in air in a forced draft oven at 325°C. with periodic measurements of weight loss. Results were as follows:

| Hours of Aging | Wt. Loss, % | | | | |
|---|---|---|---|---|---|
| | OI-2A | OI-3A | OI-5A | OI-6A | OI-7A |
| 18 | 1.6 | 1.1 | 0.6 | 7.9 | 1.8 |
| 45 | 1.4 | 1.5 | 1.3 | 9.9 | 1.9 |
| 139 | 2.6 | 1.6 | 1.7 | 15.0 | 5.5 |
| 187 | 3.2 | 2.4 | 2.3 | 16.4 | 6.0 |
| 332 | 4.4 | 3.6 | 4.1 | 18.8 | 9.1 |

The films after aging were clear amber, intact, and fairly flexible.

EXAMPLE XVII

Oxadiazole-Imide Laminate

A 15% solution of OI-2A (Example XIV) was applied by dipping to twelve 13 inch × 13 inch sheets of No. 181 E-glass cloth with A1100 sizing. Three successive coats were applied. After each coat, the treated cloth was air-dried for 12 min. and then baked in a forced draft oven for 24 min. at 100°C., 36 min. at 160°C., and 15 min. at 282°C. The treated cloth contained 32.4% resin. The sheets were trimmed to 12 inch × 12 inch, stacked, and pressed for one hour at 200 psi and 380°C. A hard, glossy, well-bonded dark brown board was obtained, containing 32.0% resin. The average thickness was 0.130 inch. Flexural properties were measured on 1 inch × 4 inch specimens cut from the board. The following values were observed:

| | Flex. Strength, psi | Flex. Modulus psi |
|---|---|---|
| Initial, Room Temp. | 45,000 | 2.57 × 10$^6$ |
| At 600°F., after 24 hrs. at 600°F. | 24,900 | 1.91 × 10$^6$ |
| At 600°F., after 250 hrs. at 600°F. | 11,600 | 2.04 × 10$^6$ |
| At 600°F., after 500 hrs. at 600°F. | 10,400 | 2.20 × 10$^6$ |

Similar laminates were prepared from the amic acid-hydrazide and imide-oxadiazole intermediates. The products had exceptionally good physical properties and outstanding thermal stability.

From the foregoing description and illustrative examples it will be seen that there is provided to those skilled in the art a novel class of resinous oxadiazoleimide copolymers. The resins are easily prepared and are characterized by outstanding physical properties and greatly improved thermal stability. They are adapted for use as electrical insulation, high temperature laminates, cast films, molding powders, and the like uses.

I claim as my invention:

1. A film and filament forming polymer consisting essentially of the repeating unit

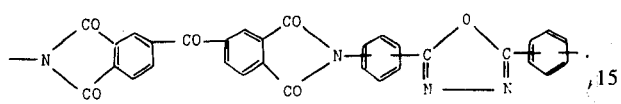

2. A film and filament forming polymer consisting essentially of the repeating unit

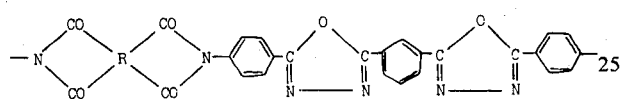

wherein R is selected from the group consisting of

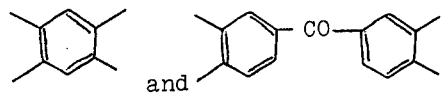

3. A substantially insoluble and infusible oxadiazoleimide copolymer consisting essentially of the repeating unit

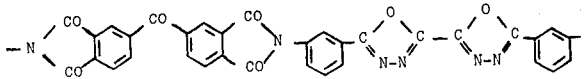

4. A substantially insoluble and infusible oxadiazoleimide copolymer consisting essentially of the repeating units

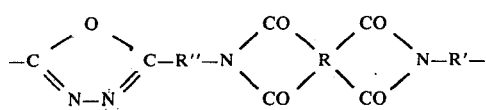

wherein R is

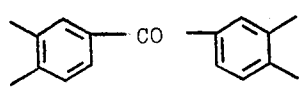

R' and R'' are divalent aromatic radicals selected from the group consisting of

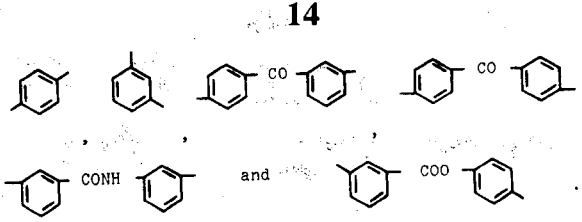

5. A soluble resinous polymeric intermediate consisting essentially of the repeating unit

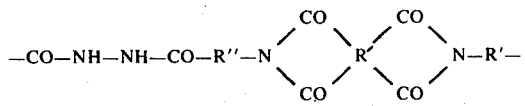

wherein R is selected from the group consisting of

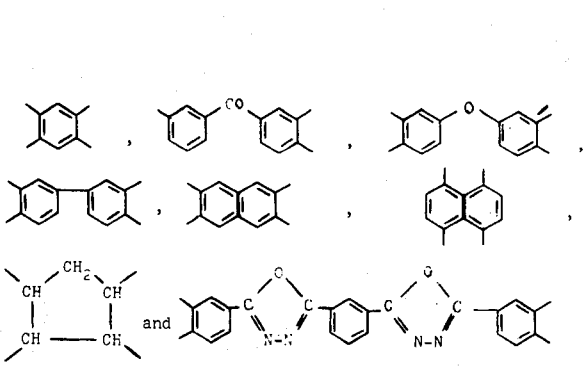

and R' and R'' are divalent aromatic radicals selected from the group consisting of

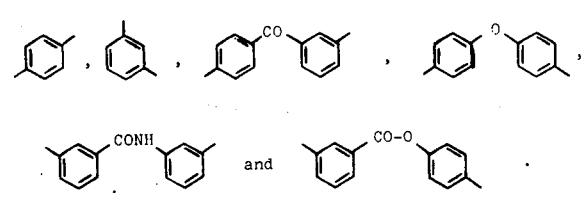

6. A thin cast resinous film characterized by its outstanding flexibility and thermal stability consisting essentially of the repeating unit

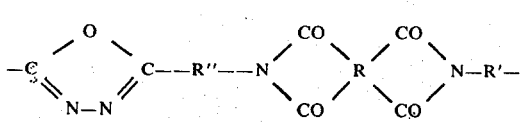

wherein R is selected from the group consisting of

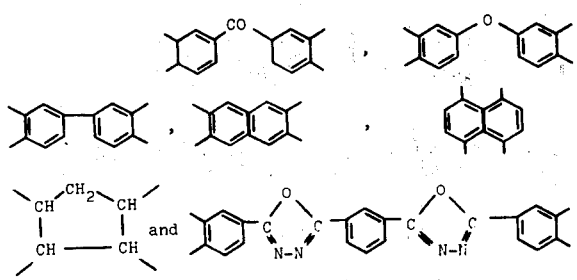
and R' and R'' are divalent aromatic radicals selected from the group consisting of
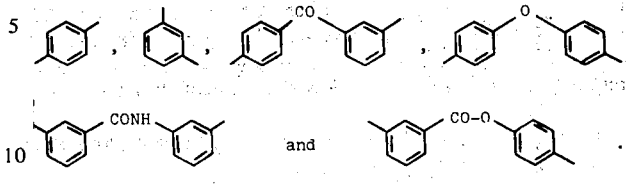
* * * * *